United States Patent
Sha et al.

(10) Patent No.: US 11,688,143 B2
(45) Date of Patent: Jun. 27, 2023

(54) METHOD, ELECTRONIC DEVICE, AND COMPUTER PROGRAM PRODUCT FOR PROCESSING AN IMAGE

(71) Applicant: EMC IP Holding Company LLC, Hopkinton, MA (US)

(72) Inventors: Danqing Sha, Shanghai (CN); Qiang Chen, Shanghai (CN); Zhen Jia, Shanghai (CN); Jinpeng Liu, Shanghai (CN)

(73) Assignee: EMC IP Holdinq Company LLC, Hopkinton, MA (US)

( * ) Notice: Subject to any disclaimer, the term of this patent is extended or adjusted under 35 U.S.C. 154(b) by 9 days.

(21) Appl. No.: 17/179,988

(22) Filed: Feb. 19, 2021

(65) Prior Publication Data
US 2022/0245899 A1    Aug. 4, 2022

(30) Foreign Application Priority Data

Jan. 29, 2021    (CN) .......................... 202110126097.0

(51) Int. Cl.
| | |
|---|---|
| *G06T 15/00* | (2011.01) |
| *G06T 19/00* | (2011.01) |
| *G06N 3/088* | (2023.01) |
| *G06T 3/40* | (2006.01) |
| *G06V 10/40* | (2022.01) |
| *G06N 3/045* | (2023.01) |

(52) U.S. Cl.
CPC ........... *G06T 19/006* (2013.01); *G06N 3/045* (2023.01); *G06N 3/088* (2013.01); *G06T 3/4046* (2013.01); *G06V 10/40* (2022.01)

(58) Field of Classification Search
CPC ......... G06T 19/00; G06T 17/20; G06T 17/00; G06T 15/10; G06T 15/00
USPC ......................................................... 345/419
See application file for complete search history.

(56) References Cited

U.S. PATENT DOCUMENTS

| | | | |
|---|---|---|---|
| 2012/0194697 A1* | 8/2012 | Hasegawa .............. | G06V 10/46 348/222.1 |
| 2013/0027396 A1* | 1/2013 | Jiang .................... | H04N 13/128 345/419 |
| 2014/0248950 A1* | 9/2014 | Tosas Bautista .......... | G06F 3/01 463/31 |

(Continued)

OTHER PUBLICATIONS

Nikola Plesa, "Machine Learning Datasets," https://www.datasetlist.com/, Jul. 2020, 30 pages.

*Primary Examiner* — Gordon G Liu
(74) *Attorney, Agent, or Firm* — Ryan, Mason & Lewis, LLP (57) ABSTRACT

Embodiments of the present disclosure relate to a method, an electronic device, and a computer program product for processing an image. The method includes acquiring an image about an augmented reality scene. The method further includes determining a target image part corresponding to a target object from the image. The method further includes using a machine learning model to augment information about the target object in the target image part to obtain an augmented target image part. The method further includes displaying the augmented target image part. Through the method, augmentation of an augmented reality image may be quickly achieved, the image quality is improved, the use of hardware resources is reduced, and user experience is improved.

20 Claims, 4 Drawing Sheets

(56) References Cited

U.S. PATENT DOCUMENTS

| | | | |
|---|---|---|---|
| 2019/0012802 A1* | 1/2019 | Liu | G06V 20/70 |
| 2021/0274092 A1* | 9/2021 | Thurston, III | G06T 7/11 |
| 2021/0303885 A1* | 9/2021 | Hassan | G06K 9/6256 |

* cited by examiner

METHOD, ELECTRONIC DEVICE, AND COMPUTER PROGRAM PRODUCT FOR PROCESSING AN IMAGE

RELATED APPLICATION(S)

The present application claims priority to Chinese Patent Application No. 202110126097.0, filed Jan. 29, 2021, and entitled "Method, Electronic Device, and Computer Program Product for Processing Image," which is incorporated by reference herein in its entirety.

FIELD

Embodiments of the present disclosure relate to the field of images, and in particular, to a method, an electronic device, and a computer program product for processing an image.

BACKGROUND

Augmented reality (AR) technology is a technology that ingeniously combines virtual information and the real world. The technology uses a variety of technical means such as multimedia, 3-dimensional modeling, real-time tracking and registration, intelligent interaction, and sensing, to simulate the virtual information such as computer-generated text, images, 3-dimensional models, music, and video, and then apply it to the real world. The two kinds of information complement each other, thus realizing "augmentation" of the real world.

The augmented reality technology not only can effectively reflect the content of the real world, but also can promote the display of the virtual information content. In visual augmented reality, the real world can overlap with computer graphics, and the augmented real world can be fully seen after the overlapping. However, there are still many problems to be solved in an augmented reality scene.

SUMMARY

Embodiments of the present disclosure provide a method, an electronic device, and a computer program product for processing an image.

According to a first aspect of the present disclosure, a method for processing an image is provided. The method includes acquiring an image about an augmented reality scene. The method further includes determining a target image part corresponding to a target object from the image. The method further includes using a machine learning model to augment information about the target object in the target image part to obtain an augmented target image part. The method further includes displaying the augmented target image part.

According to a second aspect of the present disclosure, an electronic device is provided. The electronic device includes at least one processor; and a memory coupled to the at least one processor and having instructions stored thereon, wherein the instructions, when executed by the at least one processor, cause the device to execute actions including: acquiring an image about an augmented reality scene; determining a target image part corresponding to a target object from the image; using a machine learning model to augment information about the target object in the target image part to obtain an augmented target image part; and displaying the augmented target image part.

According to a third aspect of the present disclosure, a computer program product is provided. The computer program product is tangibly stored on a non-transitory computer-readable medium and includes machine-executable instructions. The machine-executable instructions, when executed by a machine, cause the machine to execute steps of the method in the first aspect of the present disclosure.

BRIEF DESCRIPTION OF THE DRAWINGS

The above and other objectives, features, and advantages of the present disclosure will become more apparent by detailed description provided herein of example embodiments of the present disclosure, presented in conjunction with the accompanying drawings. In the example embodiments of the present disclosure, the same reference numerals generally represent the same parts.

The same or corresponding reference numerals in the various drawings represent the same or corresponding portions.

DETAILED DESCRIPTION

Illustrative embodiments of the present disclosure will be described in more detail below with reference to the accompanying drawings. Although some embodiments of the present disclosure are illustrated in the accompanying drawings, it should be understood that the present disclosure may be implemented in various forms and should not be construed as being limited to the embodiments set forth herein. Rather, these embodiments are provided for a more thorough and complete understanding of the present disclosure. It should be understood that the accompanying drawings and embodiments of the present disclosure are for illustrative purposes only, and are not intended to limit the scope of protection of the present disclosure.

In the description of the embodiments of the present disclosure, the term "include" and similar terms thereof should be understood as open-ended inclusion, i.e., "including but not limited to." The term "based on" should be understood as "based at least in part on." The term "one embodiment" or "the embodiment" should be understood as "at least one embodiment." The terms "first," "second," and the like may refer to different or identical objects. Other explicit and implicit definitions may also be included below.

The principles of the present disclosure will be described below with reference to several example embodiments shown in the accompanying drawings. Although illustrative embodiments of the present disclosure are shown in the accompanying drawings, it should be understood that the embodiments are described only to enable those skilled in the art to better understand and then implement the present disclosure, and are not intended to limit the scope of the present disclosure in any way.

The currently defined augmented reality (AR) is superposition of digital information in actual world views. In fact, this is a process of identifying specific physical objects in a camera and superimposing digital content, for example, superimposing video, audio, or 3-dimensional (3D) models. For existing AR application programs, all virtual information displayed in AR is predefined content.

The existing AR content is not intelligently provided, the provided AR content cannot be augmented or improved based on user intentions or input modes, and no machine learning algorithm is truly intelligently used for data analysis, object identification, anomaly detection, and the like.

Most existing AR application programs or products are installed in independent AR devices, and the ability to handle computation-intensive data processing requirements through real-time rendering and data analysis is limited. In addition, the hardware cost for handling such computation is high.

In order to at least solve the above and other potential problems, an embodiment of the present disclosure provides a method for processing an image. The method includes acquiring, in a computing device, an image about an augmented reality scene. Then the computing device determines a target image part corresponding to a target object from the image. The computing device uses a machine learning model to augment information about the target object in the target image part to obtain an augmented target image part. The computing device then displays the augmented target image part. Through the method, augmentation of an augmented reality image may be quickly achieved, the image quality is improved, the use of hardware resources is reduced, and user experience is improved.

Figure 1:
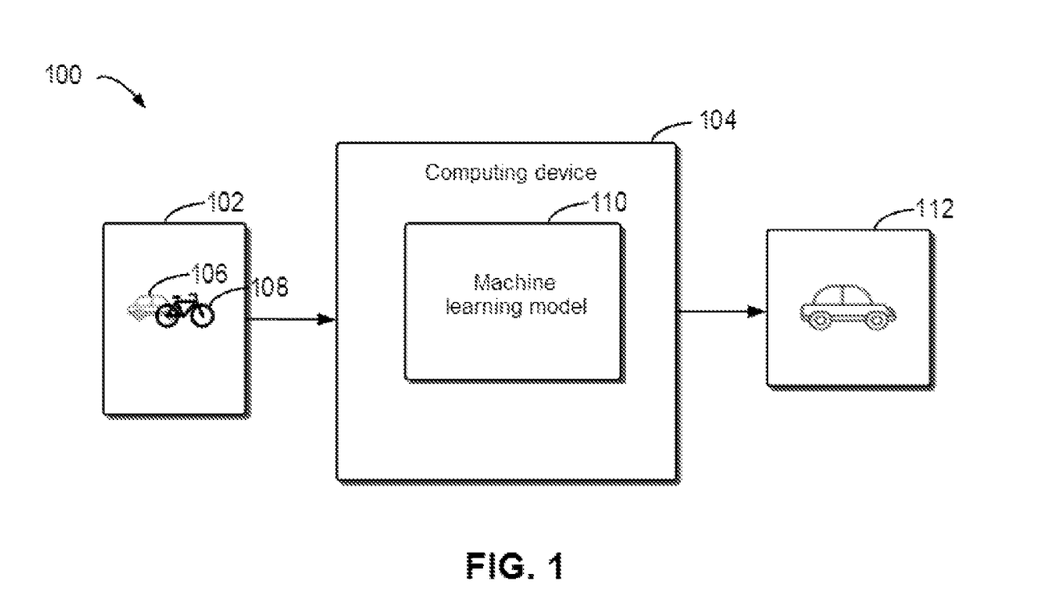
FIG. 1 illustrates a schematic diagram of example environment 100 in which a device and/or a method according to an embodiment of the present disclosure may be implemented.

The embodiments of the present disclosure will be further described in detail below with reference to the accompanying drawings. FIG. 1 shows a block diagram of example system 100 in which an embodiment of the present disclosure can be implemented. It should be understood that the structure of system 100 is described for illustrative purposes only and does not imply any limitation to the scope of the present disclosure.

As shown in FIG. 1, system 100 includes computing device 104. Computing device 104 can acquire image 102 in an augmented reality scene.

Computing device 104 includes, but is not limited to, a personal computer, a server computer, a handheld or laptop device, a mobile device (such as a mobile phone, a personal digital assistant (PDA), and a media player), a multi-processor system, a consumer electronic product, a minicomputer, a mainframe computer, a distributed computing environment including any of the above systems or devices, etc.

Image 102 is an augmented reality image. Image 102 may be obtained by AR glasses or by a camera of a device running an augmented reality application, such as a camera of computing device 104. Image 102 includes car 106 and bicycle 108. Bicycle 108 obscures car 106 in the image. Image 102 shown in FIG. 1 is only an example, not a specific limitation to the present disclosure, and it may be an image including any image content.

After computing device 104 obtains image 102 in the augmented reality scene, each object in the image may be identified. For example, car 106 and bicycle 108 are identified. Then, a user can choose to restore the obscured car to generate its unobscured complete image 112. In this process, computing device 104 can extract the image of the unobscured part of car 106, and then input it into machine learning model 110 to obtain repaired complete image 112.

Machine learning model 110 is a machine learning model for repairing an image. In some embodiments, the machine learning model is any suitable neural network model. In some embodiments, the machine learning model is a generative adversarial network model. The above examples are only for describing the present disclosure, rather than specifically limiting the present disclosure. Those skilled in the art can set the type of the machine learning model according to needs.

FIG. 1 shows that machine learning model 110 that can repair an image is used to repair a partial image of car 106 to obtain complete image 112 of the car. The machine learning model for repairing an image shown in FIG. 1 is merely an example, rather than a specific limitation to the present disclosure. Machine learning model 110 may be a machine learning model that implements any image augmentation function.

In some embodiments, machine learning model 110 in FIG. 1 may be a machine learning model configured to enhance the resolution of an image. For example, if a user feels that the image of the car is not clear, the user can manually select the car. Then the image corresponding to the car is input into a machine learning model that can enhance image resolution to enhance the resolution of the car image. In addition, the computing device can also automatically determine to perform resolution enhancement on which target objects' images.

In some embodiments, machine learning model 110 in FIG. 1 may also be configured to generate a 3-dimensional image of a target object from a 2-dimensional image of the target object. For example, if the user manually selects the car as the target object, computing device 104 inputs an image part corresponding to the car into the machine learning model to generate a 3-dimensional image of the car. The above examples are only for describing the present disclosure, rather than specifically limiting the present disclosure.

In some embodiments, when training a machine learning model, images of the real world may be used to train the machine learning model first. After the machine learning model is trained with the images of the real world, the machine learning model can be further trained with images in an augmented reality scene, such that the machine learning model can better process images in an augmented reality scene.

It is shown in FIG. 1 that the machine learning model is run on computing device 104 at a user client terminal, which is only an example, rather than a specific limitation to the present disclosure. The machine learning model can be placed in an edge computing device connected with a terminal device for execution to reduce the demand of the terminal device for high-performance hardware. Alternatively or additionally, the content generated by machine learning model 110 may be stored into a storage library of the augmented reality scene in a cloud.

Through the method, augmentation of an augmented reality image may be quickly achieved, the image quality is improved, the use of hardware resources is reduced, and user experience is improved.

A schematic diagram of example environment 100 in which a device and/or a method according to an embodiment of the present disclosure may be implemented has been described above with reference to FIG. 1. The following describes a flow chart of method 200 for processing an image according to an embodiment of the present disclosure with reference to FIG. 2. Method 200 may be executed at computing device 104 in FIG. 1 or any suitable computing device. The embodiment of FIG. 2 is further described below with reference to example environment 100, shown in FIG. 1, in which a device and/or a method according to an embodiment of the present disclosure may be implemented.

Figure 2:
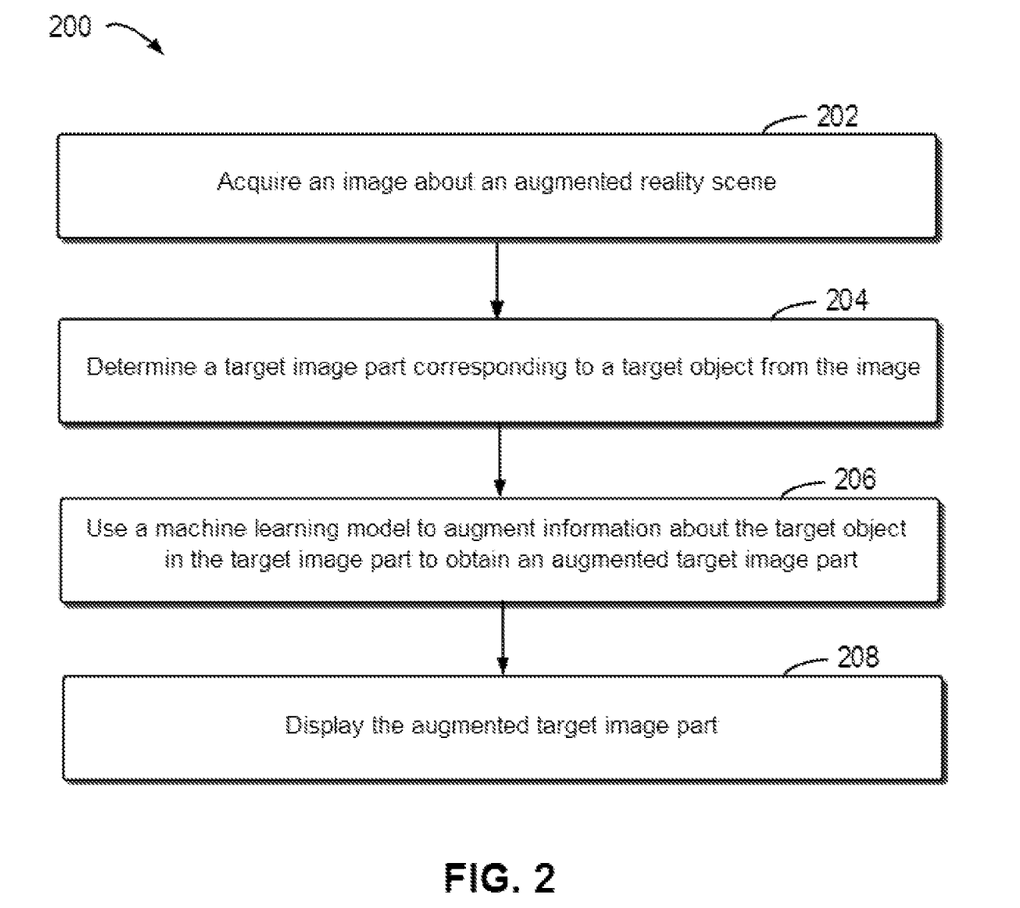
FIG. 2 illustrates a flow chart of a method 200 for processing an image according to an embodiment of the present disclosure.

As shown in FIG. 2, at block 202, computing device 104 acquires an image about an augmented reality scene. In order to process the image, the acquired image of the augmented reality scene is processed by computing device 104.

In some embodiments, computing device 104 may include a camera and run an augmented reality application. In some embodiments, computing device 104 may be a computing device connected with augmented reality glasses. The above examples are only for describing the present disclosure, rather than specifically limiting the present disclosure.

At block 204, computing device 104 determines a target image part corresponding to a target object from the image 102.

In some embodiments, computing device 104 may automatically determine whether to process the target image part of the target object. Computing device 104 extracts an image part corresponding to the target object from image 102. Then, computing device 104 zooms the image part to a predetermined display size of the target object. For example, the predetermined display size of the target object displayed on a screen of an augmented reality device may be stored in advance. Computing device 104 determines a ratio of the number of feature points of the target object in the zoomed image part to the number of standard feature points of the target object. If the ratio is lower than a threshold, the computing device automatically determines the zoomed image part as the target image part to be augmented by the machine learning model. Through the method, computing device 104 can automatically determine which image parts need to be processed, which improves the data processing efficiency and improves the user experience. The above process of automatically determining whether to perform image augmentation processing is only an example, rather than a specific limitation to the present disclosure. When determining whether to automatically perform image augmentation processing, any suitable mode may also be used.

In some embodiments, computing device 104 adjusts the size of the obtained image part of the target object according to the predetermined display size of the target object. The image part is zoomed in to the predetermined display size of the target object if computing device 104 determines that the size of the image part is smaller than the predetermined display size of the target object. The image part is zoomed out to the predetermined display size of the target object if computing device 104 determines that the size of the image part is larger than the predetermined display size of the target object. In some embodiments, computing device 104 only zooms in the image part of the target object that is smaller than the predetermined display size of the target object. Alternatively or additionally, computing device 104 only zooms in the image part of the target object when a ratio of the image size of the target object to the predetermined display size is less than a predetermined threshold. In this way, the image can be quickly adjusted to the predetermined size, which improves user experience. The above examples are only for describing the present disclosure, rather than specifically limiting the present disclosure.

At block 206, computing device 104 uses a machine learning model to augment information about the target object in the target image part to obtain an augmented target image part.

In some embodiments, the machine learning model is configured to increase the resolution of an image. Computing device 104 inputs the target image part into the machine learning model for increasing the resolution of the target image part. After a high-resolution image is obtained, the image can be detected to obtain various useful information, such as being configured to find device failures.

In some embodiments, the target image part is a partial image of the target object, and the machine learning model may be configured to generate a complete image of the object based on the partial image of the object. Computing device 104 inputs the target image part into the machine learning model to obtain a complete image of the target object.

In some embodiments, the target image part is a 2-dimensional image, and the machine learning model may be configured to convert a 2-dimensional image into a 3-dimensional image. The computing device inputs the target image part into the machine learning model to obtain a 3-dimensional image of the target object. The above examples are only for describing the present disclosure, rather than specifically limiting the present disclosure.

At block 208, computing device 104 displays the augmented target image part. In some embodiments, the user can use the augmented image part to obtain more information or interact with the augmented image part to obtain more information.

In some implementations, in the field of device maintenance, image augmentation is performed on an obtained image of a detected device in the above-mentioned mode to increase the image resolution. The augmented image is identified to obtain more image information, and then is compared with an image of the detected device under the normal state to determine the running condition of the device. For example, an image of an indicator light of a server device is taken to detect running of the server device. Generally, the taken image is not clear. At this moment, technology disclosed herein can be used to enhance the resolution of the image. Then, the indicator light of the server device is identified, and the indicator light is compared with an indicator light under the normal state to determine which devices are abnormal. The above examples are only for describing the present disclosure, rather than specifically limiting the present disclosure.

In some embodiments, images in a remote maintenance application can also be augmented in the above-mentioned mode, and maintenance personnel can remotely determine a device problem through the augmented image.

In some embodiments, since the calculation of the machine learning model requires high-performance hardware resources, in order to save the cost of a terminal, the machine learning model can be placed in an edge computing device to run. When an image needs to be processed, the image to be processed is transmitted to the edge computing device and processed by a neural network model running on the edge computing device the image. Then, the generated image is returned to a user's device, and the generated image is stored in a storage library about the augmented reality environment in a cloud.

In some embodiments, computing device 104 acquires an original image about a reality scene through a camera. Then, computing device 104 acquires feature point information in the reality scene, such as scale-invariant feature transform (SIFT) feature information. Then, computing device 104 adds information about a virtual scene to the original image based on the feature point information to realize augmented reality registration, thereby obtaining an image about the augmented reality scene. The above examples are only for describing the present disclosure, rather than specifically limiting the present disclosure. Various suitable modes may be used to realize registration of an augmented reality scene. For example, registration of augmented reality is realized based on an identifier placed in the reality scene.

In some embodiments, the machine learning model is a generative adversarial network model. By using the adversarial neural network model, unlabeled images can be used for automatic learning, which improves the learning efficiency. In some embodiments, the machine learning model is any suitable neural network model. The above examples are only for describing the present disclosure, rather than specifically limiting the present disclosure.

Through the method, augmentation of an augmented reality image may be quickly achieved, the image quality is improved, the use of hardware resources is reduced, and user experience is improved.

The above describes a flow chart of method 200 for processing an image according to an embodiment of the present disclosure with reference to FIG. 2. The following describes a flow chart of method 300 for enhancing image resolution or restoring an image according to an embodiment of the present disclosure with reference to FIG. 3. Method 300 may be executed at computing device 104 in FIG. 1 or any suitable computing device.

Figure 3:
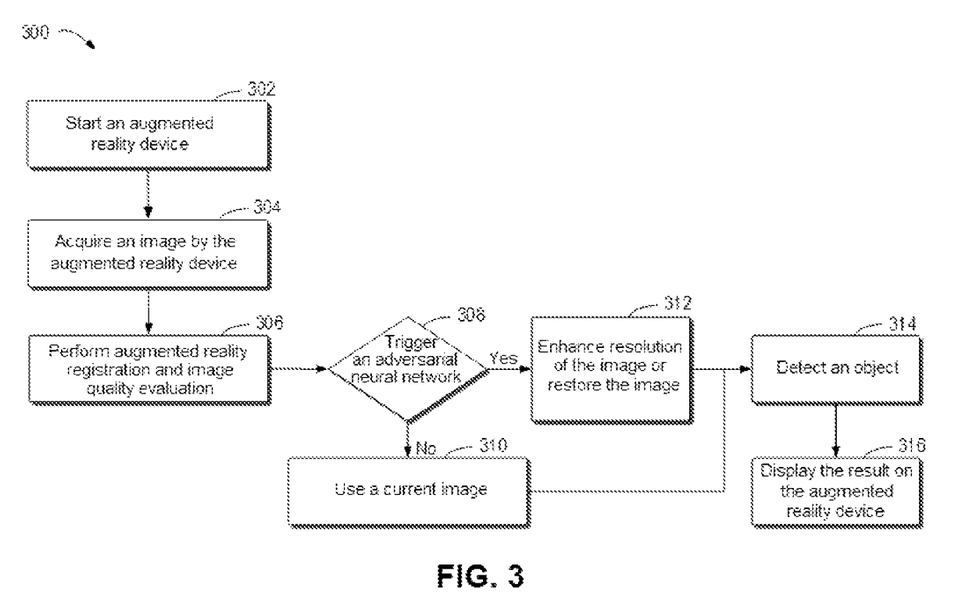
FIG. 3 illustrates a flow chart of a method 300 for enhancing image resolution or restoring an image according to an embodiment of the present disclosure.

At block 302, an augmented reality device is started, and computing device 104 may be the augmented reality device. For example, the augmented reality device is a device that runs an augmented reality application and has a camera or a device that includes augmented reality glasses.

At block 304, the augmented reality device is used to acquire an image. For example, a camera of the augmented reality device acquires an image in a reality scene. Then, at block 306, the augmented reality device performs augmented reality registration. Then, the augmented reality device acquires an image in the augmented reality site scene and evaluates the image quality. At block 308, whether to trigger an adversarial neural network is determined. For example, the adversarial neural network is automatically triggered based on the image quality evaluation result or the adversarial neural network is manually triggered by a user. If the neural network is triggered, at block 312, the adversarial neural network is used to enhance the resolution of the image or restore the image. If the neural network is not triggered, a current image is used at block 310. Then at block 314, the resolution-enhanced image, the restored image, or the current image can be detected to determine information of each object displayed in the image, for example, for determining device failures. Then at block 316, the result is displayed on the augmented reality device.

Through the method, augmentation of an augmented reality image may be quickly achieved, the image quality is improved, the use of hardware resources is reduced, and user experience is improved.

The above describes a flow chart of method 300 for enhancing image resolution or restoring an image according to an embodiment of the present disclosure with reference to FIG. 3. The following describes method 400 for generating a 3-dimensional (3D) image according to an embodiment of the present disclosure with reference to FIG. 4. Method 400 may be executed at computing device 104 in FIG. 1 or any suitable computing device.

Figure 4:
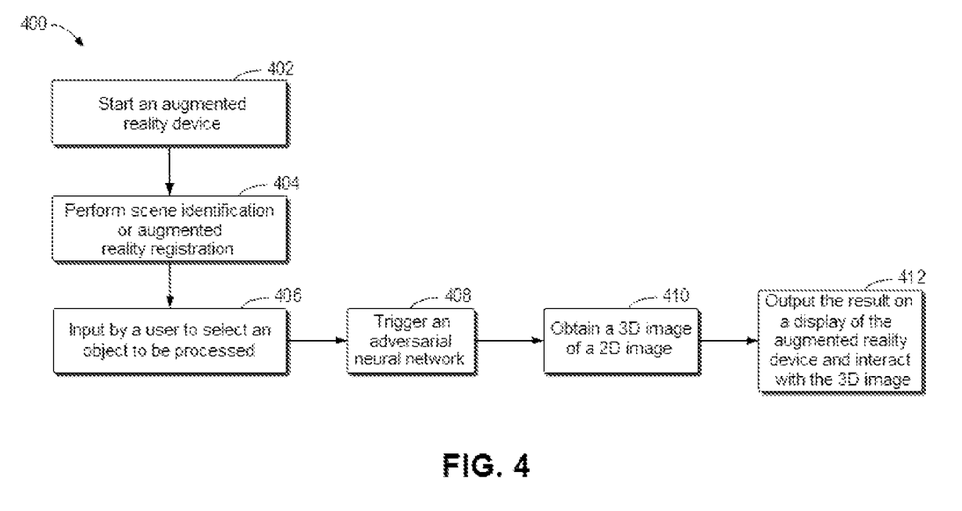
FIG. 4 illustrates a flow chart of a method 400 for generating a 3-dimensional (3D) image according to an embodiment of the present disclosure.

At block 402, an augmented reality device is started, and computing device 104 may be the augmented reality device. For example, the augmented reality device is a device that runs an augmented reality application and has a camera or is augmented reality glasses.

At block 404, the augmented reality device is used to acquire an image for scene identification or performing augmented reality registration. At block 406, a user selects an object to be processed. Then, a 2-dimensional (2D) image of the object is obtained. For example, the user selects the object to be processed from the image. At block 408, an adversarial neural network is triggered to perform image augmentation processing. Then at block 410, a 3D image of the 2D image is obtained through processing of the adversarial neural network. Then at block 412, the result is output on a display of the augmented reality device and interacted with the 3D image. For example, information about the object in the 3D image that is not displayed in the 2D image can be viewed.

Through the method, augmentation of an augmented reality image may be quickly achieved, the image quality is improved, the use of hardware resources is reduced, and user experience is improved.

Figure 5:
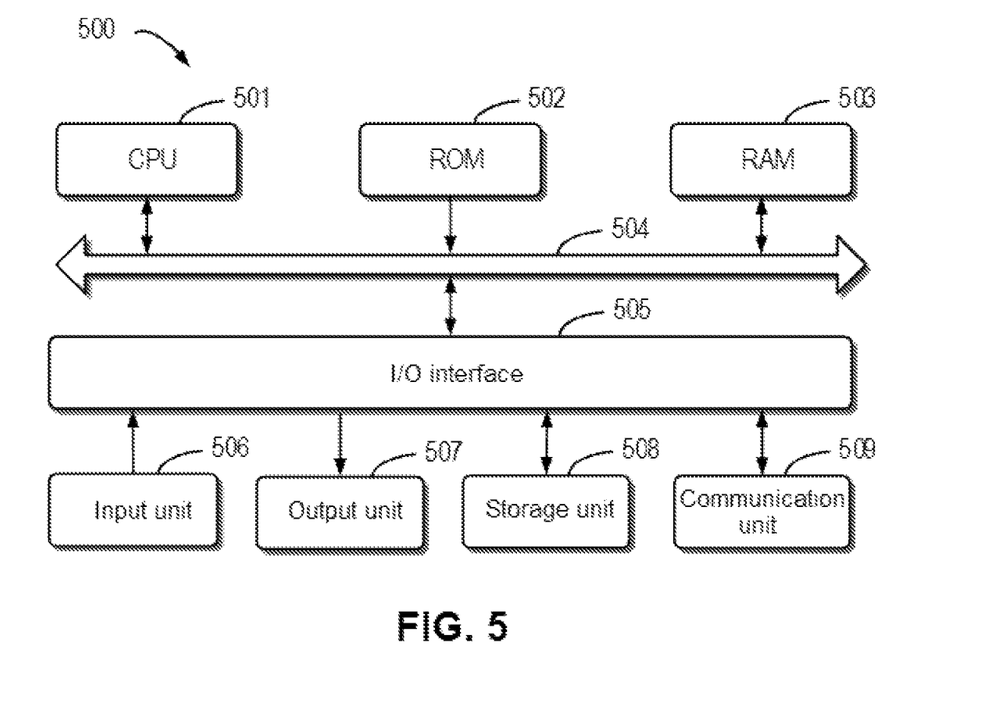
FIG. 5 illustrates a schematic block diagram of example device 500 applicable to implement an embodiment of the present disclosure.

FIG. 5 shows a schematic block diagram of example device 500 that may be configured to implement an embodiment of the present disclosure. Computing device 104 in FIG. 1 may be implemented by device 500. As shown in the figure, device 500 includes central processing unit (CPU) 501 that may execute various appropriate actions and processing according to computer program instructions stored in read-only memory (ROM) 502 or computer program instructions loaded from storage unit 508 into random access memory (RAM) 503. In RAM 503, various programs and data required for the operation of storage device 500 may also be stored. CPU 501, ROM 502, and RAM 503 are connected with each other through bus 504. Input/output (I/O) interface 505 is also connected to bus 504.

Multiple components in device 500 are connected to I/O interface 505, including: input unit 506, such as a keyboard and a mouse; output unit 507, such as various types of displays and speakers; storage unit 508, such as a magnetic disk and an optical disk; and communication unit 509, such as a network card, a modem, and a wireless communication transceiver. Communication unit 509 allows device 500 to exchange information/data with other devices through a computer network such as the Internet and/or various telecommunication networks.

The various processes and processing described above, for example, methods 200, 300, and 400, may be executed by CPU 501. For example, in some embodiments, methods 200, 300, and 400 may be implemented as a computer software program that is tangibly included in a machine-readable medium, such as storage unit 508. In some embodiments, part or all of the computer program may be loaded and/or installed to device 500 via ROM 502 and/or communication unit 509. When the computer program is loaded to RAM 503 and executed by CPU 501, one or more actions in methods 200, 300, and 400 described above can be executed.

Illustrative embodiments of the present disclosure include a method, an apparatus, a system, and/or a computer program product. The computer program product may include a computer-readable storage medium on which computer-readable program instructions for executing various aspects of the present disclosure are loaded.

The computer-readable storage medium may be a tangible device that can hold and store instructions used by an instruction execution device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disk read-only memory (CD-ROM), a digital versatile disk (DVD), a memory stick, a floppy disk, a mechanical coding device such as a punch card or protruding structures in a groove on which instructions are stored, and any appropriate combination of the above. The computer-readable storage medium used herein is not to be interpreted as transient signals per se, such as radio waves or other freely propagating electromagnetic waves, electromagnetic waves propagating through waveguides or other transmission media (e.g., light pulses passing through fiber-optic cables), or electrical signals transmitted through electrical wires.

The computer-readable program instructions described herein can be downloaded from the computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from the network and forwards the computer-readable program instructions for storage in the computer-readable storage medium in each computing/processing device.

The computer program instructions for executing the operation of the present disclosure may be assembly instructions, instruction set architecture (ISA) instructions, machine instructions, machine-dependent instructions, microcode, firmware instructions, state setting data, or source code or object code written in any combination of one or more programming languages, the programming languages including object-oriented programming languages such as Smalltalk and C++, and conventional procedural programming languages such as the C language or similar programming languages. The computer-readable program instructions may be executed entirely on a user's computer, partly on a user's computer, as a stand-alone software package, partly on a user's computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet by using an Internet service provider). In some embodiments, an electronic circuit, such as a programmable logic circuit, a field programmable gate array (FPGA), or a programmable logic array (PLA), may be subjected to personalized customization by utilizing status information of the computer-readable program instructions. The electronic circuit may execute the computer-readable program instructions to implement various aspects of the present disclosure.

Various aspects of the present disclosure are described here with reference to flow charts and/or block diagrams of the method, the apparatus (system), and the computer program product according to the embodiments of the present disclosure. It should be understood that each block of the flow charts and/or block diagrams and combinations of blocks in the flow charts and/or block diagrams can be realized by the computer-readable program instructions.

The computer-readable program instructions may be provided to a processing unit of a general-purpose computer, a special-purpose computer, or a further programmable data processing apparatus, thereby producing a machine, such that the instructions, when executed by the processing unit of the computer or the further programmable data processing apparatus, produce an apparatus for realizing functions/actions specified in one or more blocks in the flow charts and/or block diagrams. The computer-readable program instructions may also be stored in the computer-readable storage medium, and the instructions cause a computer, a programmable data processing apparatus, and/or other devices to operate in a specific manner; and thus the computer-readable medium having instructions stored includes an article of manufacture that includes instructions that realize various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, and the module, program segment, or part of an instruction includes one or more executable instructions for realizing specified logical functions. In some alternative implementations, functions marked in the blocks may also occur in an order different from that marked in the accompanying drawings. For example, two successive blocks may actually be executed substantially in parallel, and sometimes they may also be executed in an inverse order, which depends on involved functions. It should be further noted that each block in the block diagrams and/or flow charts as well as a combination of blocks in the block diagrams and/or flow charts may be implemented by using a special hardware-based system that executes specified functions or actions, or using a combination of special hardware and computer instructions.

Various embodiments of the present disclosure have been described above. The foregoing description is illustrative rather than exhaustive, and is not limited to the disclosed embodiments. Numerous modifications and alterations are apparent to those of ordinary skill in the art without departing from the scope and spirit of the illustrated embodiments. The selection of terms used herein is intended to best explain the principles and practical applications of the embodiments or technical improvements to technologies in the market, and to otherwise enable persons of ordinary skill in the art to understand the embodiments disclosed herein.

What is claimed is:

1. A method for processing an image, comprising:
acquiring an image about an augmented reality scene;
determining a target image part corresponding to a target object from the image;
using a machine learning model to augment information about the target object in the target image part to obtain an augmented target image part; and
displaying the augmented target image part;
wherein the machine learning model is configured to generate a complete image of a given object based on a partial image of the given object;
wherein the target image part comprises an unobscured part of an obscured image of the target object, the obscured image of the target object further comprising an obscured part that is obscured by at least a portion of an image of an additional object different than the target object; and
wherein using a machine learning model to augment information about the target object in the target image part comprises:
extracting the unobscured part of the target image part of the image; and
inputting the unobscured part of the target image part to the machine learning model to obtain a complete unobscured image of the target object as the augmented target image part.

2. The method according to claim 1, wherein determining the target image part comprises:
extracting an image part corresponding to the target object from the image;
zooming the image part to a predetermined display size of the target object;
determining a ratio of the number of feature points of the target object in the zoomed image part to the number of standard feature points of the target object; and
determining the zoomed image part as the target image part in response to the ratio being less than a threshold.

3. The method according to claim 2, wherein zooming the image part to a predetermined display size of the target object comprises:
zooming in the image part to the predetermined display size of the target object if it is determined that a size of the image part is smaller than the predetermined display size of the target object; and
zooming out the image part to the predetermined display size of the target object if it is determined that the size of the image part is larger than the predetermined display size of the target object.

4. The method according to claim 1, wherein using a machine learning model to augment information about the target object in the target image part comprises:
inputting the target image part to the machine learning model for increasing the resolution of the target image part, wherein the machine learning model is configured to increase the resolution of an image.

5. The method according to claim 1, wherein the target image part is a 2-dimensional image;
wherein using a machine learning model to augment information about the target object in the target image part comprises:
inputting the target image part to the machine learning model to obtain a 3-dimensional image of the target object, wherein the machine learning model is configured to convert a 2-dimensional image into a 3-dimensional image.

6. The method according to claim 1, further comprising:
acquiring an original image about a reality scene through a camera;
acquiring feature point information in the reality scene; and
adding information about a virtual scene to the original image based on the feature point information to obtain the image about the augmented reality scene.

7. The method according to claim 1, wherein the machine learning model is a generative adversarial network model.

8. An electronic device, comprising:
at least one processor; and
a memory coupled to the at least one processor and having instructions stored thereon, wherein the instructions, when executed by the at least one processor, cause the electronic device to execute actions comprising:
acquiring an image about an augmented reality scene;
determining a target image part corresponding to a target object from the image;
using a machine learning model to augment information about the target object in the target image part to obtain an augmented target image part; and
displaying the augmented target image part;
wherein the machine learning model is configured to generate a complete image of a given object based on a partial image of the given object;
wherein the target image part comprises an unobscured part of an obscured image of the target object, the obscured image of the target object further comprising an obscured part that is obscured by at least a portion of an image of an additional object different than the target object; and
wherein using a machine learning model to augment information about the target object in the target image part comprises:
extracting the unobscured part of the target image part of the image; and
inputting the unobscured part of the target image part to the machine learning model to obtain a complete unobscured image of the target object as the augmented target image part.

9. The electronic device according to claim 8, wherein determining the target image part comprises:
extracting an image part corresponding to the target object from the image;
zooming the image part to a predetermined display size of the target object;
determining a ratio of the number of feature points of the target object in the zoomed image part to the number of standard feature points of the target object; and
determining the zoomed image part as the target image part in response to the ratio being less than a threshold.

10. The electronic device according to claim 9, wherein zooming the image part to a predetermined display size of the target object comprises:
zooming in the image part to the predetermined display size of the target object if it is determined that a size of the image part is smaller than the predetermined display size of the target object; and
zooming out the image part to the predetermined display size of the target object if it is determined that the size of the image part is larger than the predetermined display size of the target object.

11. The electronic device according to claim 8, wherein using a machine learning model to augment information about the target object in the target image part comprises:
- inputting the target image part to the machine learning model for increasing the resolution of the target image part, wherein the machine learning model is configured to increase the resolution of an image.

12. The electronic device according to claim 8, wherein the target image part is a 2-dimensional image;
- wherein using a machine learning model to augment information about the target object in the target image part comprises:
- inputting the target image part to the machine learning model to obtain a 3-dimensional image of the target object, wherein the machine learning model is configured to convert a 2-dimensional image into a 3-dimensional image.

13. The electronic device according to claim 8, wherein the actions further comprise:
- acquiring an original image about a reality scene through a camera;
- acquiring feature point information in the reality scene; and
- adding information about a virtual scene to the original image based on the feature point information to obtain the image about the augmented reality scene.

14. The electronic device according to claim 8, wherein the machine learning model is a generative adversarial network model.

15. A computer program product tangibly stored on a non-transitory computer-readable medium and comprising machine-executable instructions, wherein the machine-executable instructions, when executed by a machine, cause the machine to execute steps of a method for processing an image, comprising:
- acquiring an image about an augmented reality scene;
- determining a target image part corresponding to a target object from the image;
- using a machine learning model to augment information about the target object in the target image part to obtain an augmented target image part; and
- displaying the augmented target image part;
- wherein the machine learning model is configured to generate a complete image of a given object based on a partial image of the given object;
- wherein the target image part comprises an unobscured part of an obscured image of the target object, the obscured image of the target object further comprising an obscured part that is obscured by at least a portion of an image of an additional object different than the target object; and
- wherein using a machine learning model to augment information about the target object in the target image part comprises:
- extracting the unobscured part of the target image part of the image; and
- inputting the unobscured part of the target image part to the machine learning model to obtain a complete unobscured image of the target object as the augmented target image part.

16. The computer program product according to claim 15, wherein determining the target image part comprises:
- extracting an image part corresponding to the target object from the image;
- zooming the image part to a predetermined display size of the target object;
- determining a ratio of the number of feature points of the target object in the zoomed image part to the number of standard feature points of the target object; and
- determining the zoomed image part as the target image part in response to the ratio being less than a threshold.

17. The computer program product according to claim 16, wherein zooming the image part to a predetermined display size of the target object comprises:
- zooming in the image part to the predetermined display size of the target object if it is determined that a size of the image part is smaller than the predetermined display size of the target object; and
- zooming out the image part to the predetermined display size of the target object if it is determined that the size of the image part is larger than the predetermined display size of the target object.

18. The computer program product according to claim 15, wherein using a machine learning model to augment information about the target object in the target image part comprises:
- inputting the target image part to the machine learning model for increasing the resolution of the target image part, wherein the machine learning model is configured to increase the resolution of an image.

19. The computer program product according to claim 15, wherein the target image part is a 2-dimensional image;
- wherein using a machine learning model to augment information about the target object in the target image part comprises:
- inputting the target image part to the machine learning model to obtain a 3-dimensional image of the target object, wherein the machine learning model is configured to convert a 2-dimensional image into a 3-dimensional image.

20. The computer program product according to claim 15, further comprising:
- acquiring an original image about a reality scene through a camera;
- acquiring feature point information in the reality scene; and
- adding information about a virtual scene to the original image based on the feature point information to obtain the image about the augmented reality scene.

* * * * *

UNITED STATES PATENT AND TRADEMARK OFFICE
CERTIFICATE OF CORRECTION

PATENT NO. : 11,688,143 B2  
APPLICATION NO. : 17/179988  
DATED : June 27, 2023  
INVENTOR(S) : Danqing Sha et al.

Page 1 of 1

It is certified that error appears in the above-identified patent and that said Letters Patent is hereby corrected as shown below:

On the Title Page

In (73) Assignee:
Please delete "EMC IP Holdinq Company LLC" and insert therefor --EMC IP Holding Company LLC--

Signed and Sealed this
Twenty-fifth Day of July, 2023

Katherine Kelly Vidal  
*Director of the United States Patent and Trademark Office*